(12) United States Patent
Joye et al.

(10) Patent No.: US 9,729,323 B2
(45) Date of Patent: Aug. 8, 2017

(54) METHOD OF CRYPTOGRAPHIC PROCESSING OF DATA ON ELLIPTIC CURVES, CORRESPONDING ELECTRONIC DEVICE AND COMPUTER PROGRAM PRODUCT

(71) Applicant: THOMSON LICENSING, Issy de Moulineaux (FR)

(72) Inventors: Marc Joye, Fougeres (FR); Raveen Goundar, Fiji Islands (BA)

(73) Assignee: Thomson Licensing, Issy-les-Moulineaux (FR)

( * ) Notice: Subject to any disclaimer, the term of this patent is extended or adjusted under 35 U.S.C. 154(b) by 53 days.

(21) Appl. No.: 14/634,998

(22) Filed: Mar. 2, 2015

(65) Prior Publication Data
US 2015/0256340 A1 Sep. 10, 2015

(30) Foreign Application Priority Data

Mar. 3, 2014 (EP) ..................................... 14305303

(51) Int. Cl.
*G06F 21/00* (2013.01)
*H04L 9/30* (2006.01)
(Continued)

(52) U.S. Cl.
CPC ............ *H04L 9/3066* (2013.01); *G06F 7/725* (2013.01); *G06F 7/726* (2013.01); *H04L 9/0816* (2013.01); *H04L 2209/24* (2013.01)

(58) Field of Classification Search
None
See application file for complete search history.

(56) References Cited

U.S. PATENT DOCUMENTS

| 5,737,424 A | 4/1998 | Elteto et al. |
| 7,764,785 B2 | 7/2010 | Al-Khoraidly et al. |

(Continued)

FOREIGN PATENT DOCUMENTS

JP 2001290420 10/2001

OTHER PUBLICATIONS

Brier et al: "Fast Point Multiplication on Elliptic Curves through Isogenies"; Applied Algebra, Algebraic Algorithms and Error-Correcting Codes. International Symposium AAECC, XX, XXvol. 2643, Jan. 1, 2003; pp. 43-50.

(Continued)

*Primary Examiner* — Eric Chen
(74) *Attorney, Agent, or Firm* — Myers Wolin LLC

(57) ABSTRACT

In one embodiment, it is proposed a method of cryptographic processing of data, the method being executed by an electronic device, and comprising obtaining at least two points belonging to a same elliptic curve defined on an algebraic structure being a finite ring, each point being represented by at least two coordinates. The method is remarkable in that it comprises:
obtaining a parameterization of an isomorphism between said elliptic curve and another elliptic curve, said parameterization defining some configuration parameters, each configuration parameter having a range of possible values;
determining in function of values of coordinates of said at least two points said configuration parameters, delivering determined configuration parameters; and
obtaining coordinates of another point corresponding to an image of an addition of said at least two points through said isomorphism, said another point belonging to said another elliptic curve, and said obtaining being performed without an inversion operation in said algebraic structure, due to said determined configuration parameters.

15 Claims, 8 Drawing Sheets

(51) Int. Cl.
G06F 7/72 (2006.01)
H04L 9/08 (2006.01)
H04K 1/00 (2006.01)
H04L 9/00 (2006.01)
H04L 9/28 (2006.01)

(56) References Cited

U.S. PATENT DOCUMENTS

| | | | |
|---|---|---|---|
| 2004/0228478 A1* | 11/2004 | Joye | G06F 7/724 380/28 |
| 2013/0202104 A1* | 8/2013 | Ghouti | H04L 9/3013 380/28 |
| 2014/0177824 A1* | 6/2014 | Al-Somani | H04L 9/003 380/28 |

OTHER PUBLICATIONS

"Projective Coordinates"; Elliptic Curve Public Key Cryptosystems 6.3; Jan. 1993 (Jan. 1, 1993); pp. 90-91.
Qin et al: "A Fast ECC Digital Signature Based on DSP"; 2010 International Conference on Computer Application and System Modeling; IEEE, pp. V7-83-V7-86.
Yasuda et al: "Application of Scalar Multiplication of Edwards Curves to Pairing-Based Cryptography"; Advances in Information and Computer Security. 7th International Workshop on Security, IWSEC 2012; pp. 19-36.
Devigne et al:"Binary Huff curves"; Topics in Cryptology—CT-RSA 2011, vol. 6558 of Lecture Notes in Computer Science, pp. 340-355. Springer, 2011.
Goundar et al:"Co-Z addition formula andbinary ladders on elliptic curves"; Cryptographic Hardware and Embedded Systems ? CHES 2010, vol. 6225 of Lecture Notesin Computer Science, pp. 65-79. Springer, 2010.
Goundar et al: "Scalar multiplication on Weierstrass elliptic curves from co-z arithmetic"; Journal of Cryptographic Engineering, 1(2):161-176, 2011.
Hutter et al: "Memory constrained implementations of elliptic curve cryptography in co-Z coordinate representation"; Progress in Cryptology AFRICACRYPT 2011, vol. 6737 of Lecture Notes in Computer Science, pp. 170-187. Springer, 2011.
Izu et al:"A fast parallel elliptic curve multiplication resistantagainst side channel attacks"; Public Key Cryptography (PKC 2002), vol. 2274 of Lecture Notes in Computer Science, pp. 280-296. Springer, 2002.
Joye et al: "Huff's model for elliptic curves."; Cryptographic . . . , vol. 6225 of Lecture Notes in Computer Science, pp. 1-17; Springer.
Montgomery: "Speeding up the Pollard and elliptic curve methods of factorization"; Mathematics of Computation, vol. 48; Issue 177: pp. 243-264, 1987.
Farashahi et al:"Efficient Arithmetic on Hessian Curves"; Cryptographic . . . , vol. 6225 of Lecture Notes in Computer Science, pp. 1-18; Springer.
IEEE Std P1363-2000. "IEEE Standard specifications for public key cryptography"; IEEE Computer Society, Jan. 30, 2000; Microprocessor & Microcomputer Standards Committee; pp. 1-236.
"Digital signature standard (DSS)."; Federal Information Processing Standards Publication, Jun. 2009; pp. 1-131.
Longa et al:"Novel precomputation schemes for ellipticcurve cryptosystems"; Applied Cryptography and Network Security (ACNS 2009), vol. 5536 of Lecture Notes in Computer Science, pp. 71-88.Springer, 2009.
Bernstein et al:"Binary Edward Curves"; Cryptographic Hardware and Embedded Systems CHES 2008, vol. 5154 of Lecture Notes in Computer Science, pp. 244-265. Springer, 2008.
Longa et al:"New composite operations and precomputation forelliptic curve cryptosystems over prime fields."; PKC 2008, vol. 4939 of Lecture Notes in Computer Science, pp. 229-247. Springer, 2008.
Bernstein et al:"Faster addition and doubling on elliptic curves"; ASIACRYPT 2007, vol. 4833 of Lecture Notes in Computer Science, pp. 29-50. Springer, 2007.
Joye: "Highly regular right-to-left algorithms for scalar multiplication"; Cryptographic Hardware and Embedded Systems CHES 2007, vol. 4727 of Lecture Notes in Computer Science, pp. 135-147.Springer, 2007.
Meloni: "New point addition formula for ECC applications."; Arithmetic of Finite Fields (WAIFI 2007), vol. 4547 of Lecture Notes in Computer Science, pp. 189-201. Springer, 2007.
Blake et al: "Advances in Elliptic Curve" Cryptography, vol. 317 of London Mathematical Society Lecture Note Series. 317; 2005; pp. 1-299.
Brier et al:"Weierstraβ elliptic curves and side-channel attacks"; Public Key Cryptography (PKC 2002), vol. 2274 of Lecture Notes in Computer Science, pp. 335-345. Springer, 2002.
Fischer et al: "Parallel scalar multiplication on general elliptic curves over Fp hedged against nondifferential side-channel attacks"; Cryptology ePrint Archive, Report 2002/007, 2002.http://eprint.iacr.org/.; pp. 1-12.
Okeya et al:"Elliptic curves with the Montgomer-form and their cryptography applications."; Public Key Cryptography (PKC 2000), vol. 1751 of Lecture Notes in Computer Science, pp. 238-257. Springer, 2000.
Lopez et al:"Fast multiplication on elliptic curves over GF(2m)without precomputation"; , Cryptographic Hardware and Embedded Systems (CHES '99), vol. 1717 of Lecture Notes in Computer Science,pp. 316-327. Springer, 1999.
De Win et al: "On the performance of signature schemes based on elliptic curves"; Algorithmic Number Theory (ANTS-III), vol. 1423 of Lecture Notes in Computer Science, pp. 252-266.Springer, 1998.
Koblitz: "Elliptic curve cryptosystems"; Mathematics of Computation, vol. 48 No. 177: 203-209, Jan. 1987.
Chudnovski et al: "Sequences of numbers generated by addition in formal groups and new primality and factorization test"; Advances in Applied Mathematics, 7(4); pp. 385-434, 1986.
Miller: "Use of elliptic curves in cryptography"; Advances in Cryptology; CRYPTO'85, vol. 218 of Lecture Notes in Computer Science, pp. 417-426. Springer, 1985.
Knuth et al: "The Art of Computer Programming :Seminumerical Algorithms"; vol. 2. Evaluation of Powers, 4.6.3rd edition, 1997, pp. 441-466.
Longa et al: "Efficient Techniques for High-Speed Elliptic Curve Cryptography" ; ECC Point Arithmetic Formulae (EPAF): Jacobian coordinates; In Proc. Workshop on Cryptographic Hardware and Embedded Systems (CHES 2010), 2010.
Bernstein et al: "Explicit Formulas Database".
Search Report Dated Aug. 8, 2014.

* cited by examiner

| Algorithm 1 Double-and-add method |
|---|
| Input: $P \in E(\mathbb{F}_q)$ and $k = (k_{n-1}, \ldots, k_0)_2 \in \mathbb{N}$<br>Output: $Q = kP$ |
| 1: $R_0 \leftarrow O; R_1 \leftarrow P$<br>2: for $i = n-1$ down to 0 do<br>3:     $R_0 \leftarrow 2R_0$<br>4:     if $(k_i = 1)$ then $R_0 \leftarrow R_0 + R_1$<br>5: end for<br>6: return $R_0$ |

| Algorithm 2 Add-and-double method |
|---|
| Input: $P \in E(\mathbb{F}_q)$ and $k = (k_{n-1}, \ldots, k_0)_2 \in \mathbb{N}$<br>Output: $Q = kP$ |
| 1: $R_0 \leftarrow O; R_1 \leftarrow P$<br>2: for $i = 0$ to $n-1$ do<br>3:     if $(k_i = 1)$ then $R_0 \leftarrow R_0 + R_1$<br>4:     $R_0 \leftarrow 2R_0$<br>5: end for<br>6: return $R_0$ |

*FIG. 2*

Algorithm 3 Double-and-add method
(with elliptic curve isomorphisms)

Input: $P \in E(\mathbb{F}_q)$ and $k = (k_{n-1},...,k_0)_2 \in \mathbb{N}$
Output: $Q = kP$ 1: $R_0 \leftarrow O;\ R_1 \leftarrow P;\ \vec{\Phi} \leftarrow \mathbb{1}$
2: for $i = n-1$ down to $0$ do
3:     $(R_0, \vec{\varphi}) \leftarrow \mathrm{iDBL}_{\vec{\Phi}}(R_0);\ R_1 \leftarrow \Psi_{\vec{\varphi}}(R_1);\ \vec{\Phi} \leftarrow \vec{\varphi} \circ \vec{\Phi}$
4:     if $(k_i = 1)$ then
5:        $(R_0, R_1, \vec{\varphi}) \leftarrow \mathrm{iADDU}_{\vec{\Phi}}(R_1, R_0);\ \vec{\Phi} \leftarrow \vec{\varphi} \circ \vec{\Phi}$
6:     end if
7: end for
8: return $\Psi_{\vec{\Phi}}^{-1}(R_0)$

---

Algorithm 4 Add-and-double method
(with elliptic curve isomorphisms)

Input: $P \in E(\mathbb{F}_q)$ and $k = (k_{n-1},...,k_0)_2 \in \mathbb{N}$
Output: $Q = kP$ 1: $R_0 \leftarrow O;\ R_1 \leftarrow P;\ \vec{\Phi} \leftarrow \mathbb{1}$
2: for $i = 0$ to $n-1$ do
3:     if $(k_i = 1)$ then
4:        $(R_0, R_1, \vec{\varphi}) \leftarrow \mathrm{iADDU}_{\vec{\Phi}}(R_1, R_0);\ \vec{\Phi} \leftarrow \vec{\varphi} \circ \vec{\Phi}$
5:     end if
6:     $(R_0, \vec{\varphi}) \leftarrow \mathrm{iDBL}_{\vec{\Phi}}(R_1);\ R_0 \leftarrow \Psi_{\vec{\varphi}}(R_0);\ \vec{\Phi} \leftarrow \vec{\varphi} \circ \vec{\Phi}$
7: end for
8: return $\Psi_{\vec{\Phi}}^{-1}(R_0)$

*FIG. 3*

Algorithm 5 Double-and-add method
(with elliptic curve isomorphisms)
Version II

Input: $P \in E(\mathbb{F}_q)$ and $k = (k_{n-1},...,k_0)_2 \in \mathbb{N}$
Output: $Q = kP$ 1: $R_0 \leftarrow O; R_1 \leftarrow P; \vec{\Phi} \leftarrow \mathbb{1}$
2: for $i = n-1$ down to $0$ do
3:     $(R_0, \vec{\varphi}) \leftarrow \text{iDBL}_{\vec{\Phi}}(R_0); \vec{\Phi} \leftarrow \vec{\varphi} \circ \vec{\Phi}$
4:     if $(k_i = 1)$ then
5:         $(R_0, \vec{\varphi}) \leftarrow \text{iADD}_{\vec{\Phi}}(R_0, \Psi_{\vec{\Phi}}(R_1)); \vec{\Phi} \leftarrow \vec{\varphi} \circ \vec{\Phi}$
6:     end if
7: end for
8: return $\Psi^{-1}_{\vec{\Phi}}(R_0)$

*FIG. 4*

Algorithm 6 Montgomery ladder

Input: $P \in E(\mathbb{F}_q)$ and $k = (k_{n-1}, ..., k_0)_2 \in \mathbb{N}$
Output: $Q = kP$ 1: $R_0 \leftarrow O; R_1 \leftarrow P$
2: for $i = n-1$ down to $0$ do
3: $\quad b \leftarrow k_i$
4: $\quad (R_{1-b}, T) \leftarrow (R_b + R_{1-b}, R_b - R_{1-b})$
5: $\quad R_b \leftarrow R_{1-b} + T$
6: end for
7: return $R_0$

Algorithm 7 Joye's double-add ladder

Input: $P \in E(\mathbb{F}_q)$ and $k = (k_{n-1}, ..., k_0)_2 \in \mathbb{N}$
Output: $Q = kP$ 1: $R_0 \leftarrow O; R_1 \leftarrow P$
2: for $i = 0$ down to $n-1$ do
3: $\quad b \leftarrow k_i$
4: $\quad T \leftarrow R_{1-b} + R_b$
5: $\quad (R_{1-b}, R_b) \leftarrow (T + R_{1-b}, T - R_{1-b})$
6: end for
7: return $R_0$

*FIG. 5*

Algorithm 8 Montgomery ladder
(with elliptic curve isomorphisms)

Input: $P \in E(\mathbb{F}_q)$ and $k = (k_{n-1}, \ldots, k_0)_2 \in \mathbb{N}$ with $k_{n-1} = 1$

Output: $Q = kP$

1: $(R_1, R_0, \vec{\Phi}) \leftarrow \text{iDBLU}_1(P)$
2: for $i = n-2$ down to $0$ do
3: $\quad b \leftarrow k_i$
4: $\quad (R_0, R_b, \vec{\varphi}) \leftarrow \text{iADDC}_{\vec{\Phi}}(R_b, R_{1-b}); \vec{\Phi} \leftarrow \vec{\varphi} \circ \vec{\Phi}$
5: $\quad (R_b, R_{1-b}, \vec{\varphi}) \leftarrow \text{iADDU}_{\vec{\Phi}}(R_{1-b}, R_b); \vec{\Phi} \leftarrow \vec{\varphi} \circ \vec{\Phi}$
6: end for
7: return $\Psi_{\vec{\Phi}}^{-1}(R_0)$

---

Algorithm 9 Joye's double-add ladder
(with elliptic curve isomorphisms)

Input: $P \in E(\mathbb{F}_q)$ and $k = (k_{n-1}, \ldots, k_0)_2 \in \mathbb{N}$ with $k_0 = 1$

Output: $Q = kP$

1: $(R_1, R_0, \vec{\Phi}) \leftarrow \text{iDBLU}_1(P)$
2: $(R_{1-k_1}, R_{k_1}, \vec{\varphi}) \leftarrow \text{iADDU}_{\vec{\Phi}}(R_0, R_1); \vec{\Phi} \leftarrow \vec{\varphi} \circ \vec{\Phi}$
3: for $i = 2$ down to $n-1$ do
4: $\quad b \leftarrow k_i$
5: $\quad (R_b, R_{1-b}, \vec{\varphi}) \leftarrow \text{iADDU}_{\vec{\Phi}}(R_{1-b}, R_b); \vec{\Phi} \leftarrow \vec{\varphi} \circ \vec{\Phi}$
6: $\quad (R_{1-b}, R_b, \vec{\varphi}) \leftarrow \text{iADDU}_{\vec{\Phi}}(R_b, R_{1-b}); \vec{\Phi} \leftarrow \vec{\varphi} \circ \vec{\Phi}$
7: end for
8: return $\Psi_{\vec{\Phi}}^{-1}(R_0)$

*FIG. 6*

Algorithm 10 Montgomery ladder
(with elliptic curve isomorphisms)
Version II

Input: $P \in E(\mathbb{F}_q)$ and $k = (k_{n-1}, \ldots, k_0)_2 \in \mathbb{N}$ with $k_{n-1} = 1$
Output: $Q = kP$ 1: $(R_1, R_0) \leftarrow \text{iDBLU}'_1(P)$
2: for $i = n - 2$ down to $1$ do
3:      $b \leftarrow k_i$ ; $(R_{1-b}, R_b) \leftarrow \text{iADDU}'(R_b, R_{1-b})$
4:      $(R_b, R_{1-b}) \leftarrow \text{iADDU}'(R_{1-b}, R_b)$
5: end for
6: $b \leftarrow k_0$ ; $(R_{1-b}, R_b) \leftarrow \text{iADDC}'(R_b, R_{1-b})$
7: Recover $\vec{\Phi} := \text{desc}(\Psi_{\vec{\Phi}})$ from $R_b = \Psi_{\vec{\Phi}}((-1)^{1-b}P)$
8: $(R_b, R_{1-b}, \vec{\varphi}) \leftarrow \text{iADDU}_{\vec{\Phi}}(R_{1-b}, R_b)$; $\vec{\Phi} \leftarrow \vec{\varphi} \circ \vec{\Phi}$
9: return $\Psi_{\vec{\Phi}}^{-1}(R_0)$

METHOD OF CRYPTOGRAPHIC PROCESSING OF DATA ON ELLIPTIC CURVES, CORRESPONDING ELECTRONIC DEVICE AND COMPUTER PROGRAM PRODUCT

This application claims the benefit, under 35 U.S.C. §119 of European Patent Application No. 14305303.1, filed Mar. 3, 2014.

FIELD OF THE INVENTION

The invention relates to cryptography, and more precisely to elliptic curve cryptography. The disclosure has numerous applications, and is suitable to be used in embedded devices. More generally, it can be applied to all cryptographic protocols and algorithms based on the use of elliptic curves.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Elliptic curve cryptography provides high level of security (exponential security) with smaller key size in comparison to the conventional RSA cryptosystem (subexponential security). The applications of ECC are increasing in our everyday lives as more and more people are relying on small electronic devices. The smaller key size makes ECC attractive for constrained devices such as PDAs or smart cards. The efficiency of ECC is dominated by an operation called scalar multiplication (or point multiplication). The problem is, given a point P on an elliptic curve (defined over a finite field or a finite ring) and a scalar k, to generate the point kP, that is, P+ . . . +P(k−1 times) as cost efficiently as possible. This problem is an obvious analogue of the evaluation of powers. Hence, methods of fast evaluation of powers can be used here to get efficient implementations.

The elliptic curve group operations can be expressed in terms of a number of operations in the definition ring. The crucial problem becomes to find the right model to represent an elliptic curve in a way to minimize the number of ring operations. Indeed, as an elliptic curve is defined up to birational transformations, there are plenty of possible choices for its representation. However, in order not to explode the number of coordinates and operations, only models of elliptic curves lying in low-dimensional spaces are considered in practice.

Furthermore, the basic operations involved in point addition formulæ (namely, ring addition/subtraction, ring multiplication, and ring inversion) are not equivalent with each other. In particular, ring inversion requires a special attention as it may significantly impact the overall performance. For cryptographic applications using elliptic curves, typical ratios for inversion over multiplication in the underlying finite ring range from 3 to 30. For that reason, inversion-free point addition formulæ are of particular interest. This is classically achieved by resorting on projective representations (including the widely-used homogeneous and Jacobian coordinates).

Numerous useful forms of elliptic curves using various coordinate systems and their respective costs are compiled in the Explicit-Formulas Database provided by D. Bernstein et al., on the website http://www.hyperelliptic.org/EFD.

When affine coordinates system is used to represent the points of an elliptic curve, there is currently no technique that prevents to use an inversion operation in a finite ring. It is an aim of the present technique to get rid of the ring inversion operation in the evaluation of a scalar multiplication. The proposed technique can of course be applied to another context where only basic operations (addition) are performed between points (as in the verification of the ECDSA algorithm).

SUMMARY OF THE INVENTION

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is directed to a method of cryptographic processing of data, the method being executed by an electronic device, and comprising obtaining at least two points belonging to a same elliptic curve defined on an algebraic structure being a finite ring, each point being represented by at least two coordinates. The method is remarkable in that it comprises:

obtaining a parameterization of an isomorphism between said elliptic curve and another elliptic curve, said parameterization defining some configuration parameters, each configuration parameter having a range of possible values;

determining in function of values of coordinates of said at least two points said configuration parameters, delivering determined configuration parameters;

obtaining coordinates of another point corresponding to an image of an addition of said at least two points through said isomorphism, said another point belonging to said another elliptic curve, and said obtaining being performed without an inversion operation in said algebraic structure, due to said determined configuration parameters.

Hence, in function of the choice of the configuration parameters of a parameterization of an isomorphism, it is possible to avoid the execution of an inversion operation in an addition of points, the choice being performed in function of the values of the coordinates of the points. It should be noted that selection of configuration parameters was not obvious due to the fact that one skilled in the art would have used random values for the configuration parameters.

In a preferred embodiment, the method is remarkable in that when said at least two points are identical, said addition is a doubling operation.

In a preferred embodiment, the method is remarkable in that each point is represented in an affine coordinate system.

In a preferred embodiment, the method is remarkable in that it is used in a scalar multiplication operation with a first point belonging to a first elliptic curve.

In a preferred embodiment, the method is remarkable in that it comprises converting an output point of said scalar multiplication operation, said output point belonging to a last elliptic curve, to a converted output point belonging to said first elliptic curve.

Hence, the proposed technique does not use inversion operation as in the state of the art. It enables efficient implementation of a scalar multiplication over elliptic curves. The proposed technique relies on the use of curve isomorphisms as a way to avoid the computation of inverses in point addition formulæ. Interestingly, the proposed technique applies whatever the model used to represent an elliptic curve and whatever the coordinate system used to represent the points. Hence the proposed technique can be applied to affine representation, Jacobian representation, etc.

In a preferred embodiment, the method is remarkable in that said algebraic structure is a finite field having a characteristic equal to 2.

In a preferred embodiment, the method is remarkable in that said algebraic structure is a finite field having a characteristic equal to 3.

In a preferred embodiment, the method is remarkable in that said algebraic structure is a finite field having a characteristic equal to a prime number p>3.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory"), or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternatively, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications.

It should also be noted that a step of obtaining an element/value in the present document can be viewed either as a step of reading such element/value in a memory unit of an electronic device or a step of receiving such element/value from another electronic device via communication means.

In another embodiment, it is proposed an electronic device configured to perform a cryptographic processing of data, said electronic device comprising means for obtaining at least two points belonging to a same elliptic curve defined on an algebraic structure being a finite ring, each point being represented by at least two coordinates. The electronic device is remarkable in that it comprises:

means for obtaining a parameterization of an isomorphism between said elliptic curve and another elliptic curve, said parameterization defining some configuration parameters, each configuration parameter having a range of possible values;

means for determining in function of values of coordinates of said at least two points said configuration parameters, delivering determined configuration parameters; and means for obtaining coordinates of another point corresponding to an image of an addition of said at least two points through said isomorphism, said another point belonging to said another elliptic curve, and said obtaining being performed without an inversion operation in said algebraic structure, due to said determined configuration parameters.

In a variant, the electronic device is remarkable in that when said at least two points are identical, said addition is a doubling operation.

In a variant, the electronic device is remarkable in that each point is represented in an affine-coordinate system.

In a variant, the electronic device is remarkable in that said means are used to perform a scalar multiplication operation with a first point belonging to a first elliptic curve.

In a variant, the electronic device is remarkable in that it comprises means for converting an output point of said scalar multiplication operation, said output point belonging to a last elliptic curve, to a converted output point belonging to said first elliptic curve.

In another embodiment, the electronic device is remarkable in that said algebraic structure is a finite field having a characteristic equal to a prime number p>3.

BRIEF DESCRIPTION OF THE FIGURES

The above and other aspects of the invention will become more apparent by the following detailed description of exemplary embodiments thereof with reference to the attached drawings in which:

FIG. 2 presents two classical methods for performing a scalar multiplication on elliptic curves (the double-and-add method, and the add-and-double method);

FIG. 3 presents two methods for performing a scalar multiplication on elliptic curves according to the present technique;

FIG. 4 presents another embodiment of a method for performing a scalar multiplication on elliptic curves according to the present technique;

FIG. 5 presents two classical methods for performing a scalar multiplication on elliptic curves (the Montgomery ladder, and the Joye's double-add ladder);

FIG. 6 presents two modifications of the methods for performing a scalar multiplication on elliptic curves disclosed in FIG. 5, according to one embodiment of the invention;

FIG. 7 presents a modification of Montgomery ladder method for performing a scalar multiplication on elliptic curves disclosed in FIG. 5, according to one embodiment of the invention;

DETAILED DESCRIPTION

Figure 1:
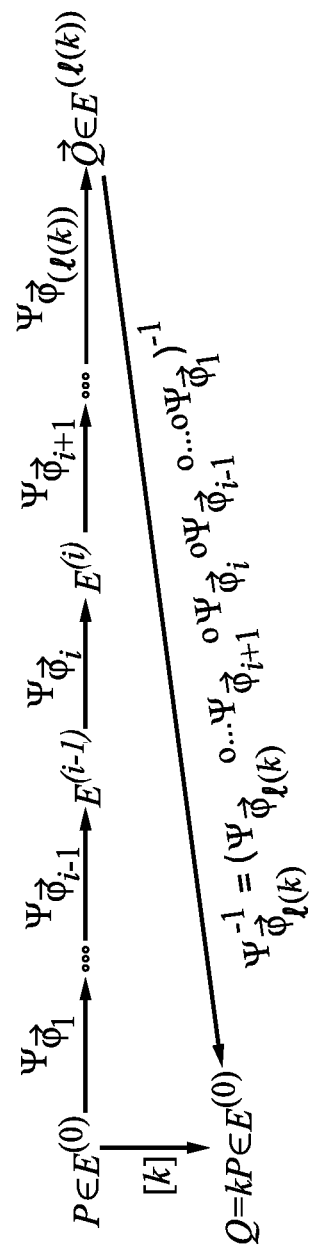
FIG. 1 presents a scalar multiplication on elliptic curves according to one embodiment of the invention.

Before describing the proposed method in its full generality, we first make a couple of observations on the Weierstraß model. To simplify the exposition, we focus on elliptic curves defined over a ring of characteristic different of 2, or 3. As is customary, we let $\mathbb{K}^*$ denote the multiplicative group of $\mathbb{K}$ and $\mathrm{Char}(\mathbb{K})$ the characteristic of $\mathbb{K}$.

Consider the elliptic curve $E_1$ over a ring $\mathbb{K}$, $\mathrm{Char}(\mathbb{K}) \neq 2, 3$, given by $$E_1: y^2 = x^3 + a \cdot x + b$$

For any $u \in \mathbb{K}^*$, elliptic curve $E_1$ is $\mathbb{K}$-isomorphic to elliptic curve.

$$E_u: y^2 = x^3 + a \cdot u^4 \cdot x + b \cdot u^6$$

via the inverse mappings $$\psi_u: E_1 \tilde{\to} E_u, \begin{cases} O \mapsto O \\ (x, y) \mapsto (u^2 x, u^3 y) \end{cases} \text{ and}$$

$$\psi_u^{-1}: E_u \tilde{\to} E_1, \begin{cases} O \mapsto O \\ (\tilde{x}, \tilde{y}) \mapsto (u^{-2} \tilde{x}, u^{-3} \tilde{y}) \end{cases}$$

Given two finite point points $P_1 = (x_1, y_1)$ and $P_2 = (x_2, y_2)$ on $E_1$ such that $P_1 \neq \pm P_2$ (i.e. such that $x_1 \neq x_2$), provided that $(x_1 - x_2) \in \mathbb{K}^*$, their sum is given by $P_3 = P_1 + P_2 = (x_3, y_3)$ where $$x_3 = \left(\frac{y_1 - y_2}{x_1 - x_2}\right)^2 - x_1 - x_2 \text{ and} \qquad (\text{eq. 1})$$

$$y_3 = \left(\frac{y_1 - y_2}{x_1 - x_2}\right)(x_1 - x_3) - y_1$$

The double of $P_1 = (x_1, y_1)$, provided that $y_1 \in \mathbb{K}^*$, is given by $P_4 = 2P_1 = P_1 + P_1 = (x_4, y_4)$ where $$x_4 = \left(\frac{3x_1^2 + a}{2y_1}\right)^2 - 2x_1 \text{ and} \qquad (\text{eq. 2})$$

$$y_4 = \left(\frac{3x_1^2 + a}{2y_1}\right)(x_1 - x_4) - y_1$$

In one embodiment of the invention, the present technique uses the following property: By defining $\phi := x_1 - x_2$, we get from the above addition equation formula (referenced eq. 1)

$$\phi^2 x_3 = (y_1 - y_2)^2 - \phi^2 x_1 - \phi^2 x_2 \text{ and } \phi^3 y_3 = (\phi^2 x_1 - \phi^2 x_3)(y_1 - y_2) - \phi^3 y_1.$$

In other words, given points $P_1$ and $P_2$ on the elliptic curve $E_1$, one can easily obtain on the isomorphic elliptic curve $E_\phi$ the point $\tilde{P}_3 = \psi_\phi(P_1 + P_2) = (\phi^2 x_3, \phi^3 y_3)$. It is worth remarking that no inversion is required in the evaluation of $\tilde{P}_3$. We let iADD denote the operation of getting $\tilde{P}_3 \in E_\phi$.

It should be noticed that a similar treatment applies to the point doubling operation (the doubling operation can be viewed as a particular addition between two points which are identical. However, the formulæ used to perform an addition if the points are equal or not are not necessarily the same). Defining now $\phi := 2y_1$, we get from the doubling formula (referenced eq. 2)

$$\phi^2 x_4 = (3x_1^2 + a)^2 - 2\phi^2 x_1 \text{ and } \phi^3 y_4 = (\phi^2 x_1 - \phi^2 x_4)(3x_1^2 + a) - \phi^3 y_1.$$

Namely, given point $P_1$ on $E_1$, one can easily obtain the point $\tilde{P}_4 = \psi_\phi(2P_1) = (\phi^2 x_4, \phi^3 y_4)$, which belongs to the elliptic curve $E_\phi$. As for the point addition, it is worth remarking that no inversion is required in the evaluation of $\tilde{P}_4$. We let iDBL denote the operation of getting $\tilde{P}_4 \in E_\phi$.

Let $E_{\parallel}$ be an elliptic curve over a ring $\mathbb{K}$. Consider a family $\{E_{\vec{\phi}}\}$ of isomorphic elliptic curves, indexed by some parameter $\vec{\phi}$, under isomorphism $$\psi_{\vec{\phi}}: E_{\parallel} \tilde{\to} E_{\vec{\phi}}$$

Parameter $\vec{\phi}$ is the description of the isomorphism (i.e. it is a parameterization that defines the isomorphism). We use the notation $\vec{\phi} = \mathrm{Desc}(\psi_{\vec{\phi}})$ (Desc being an acronym of description). The set of all possible parameters $\vec{\phi}$ is noted $\mathcal{F}$.

The following three addition operations, noted iADD, iADDU and iADDC, are defined by the following equations:

$$\begin{cases} iADD\colon E_{\vec{\phi}} \times E_{\vec{\phi}} \to E_{\vec{\phi}} \times \mathcal{F}, (P_1, P_2) \mapsto (\psi_{\vec{\phi}}(P_1 + P_2), \vec{\phi}) \\ iADDU\colon E_{\vec{\phi}} \times E_{\vec{\phi}} \to E_{\vec{\phi}} \times E_{\vec{\phi}} \times \mathcal{F}, \\ (P_1, P_2) \mapsto (\psi_{\vec{\phi}}(P_1+P_2), \psi_{\vec{\phi}}(P_1), \vec{\phi}) \\ iADDC\colon E_{\vec{\phi}} \times E_{\vec{\phi}} \to E_{\vec{\phi}} \times E_{\vec{\phi}} \times \mathcal{F}, \\ (P_1, P_2) \mapsto (\psi_{\vec{\phi}}(P_1+P_2), \psi_{\vec{\phi}}(P_1-P_2), \vec{\phi}) \end{cases}$$

For efficiency purposes, parameter $\vec{\phi}$ is chosen so that given two different points $P_1$ and $P_2$ on $E_{\vec{\phi}}$, the output of the addition operation does not require ring inversions.

We also give two doubling operations, iDBL and iDBLU, defined by the following equations:

$$\begin{cases} iDBL\colon E_{\vec{\phi}} \to E_{\vec{\phi}} \times \mathcal{F}, P_1 \mapsto (\psi_{\vec{\phi}}(2P_1), \vec{\phi}) \\ iDBLU\colon E_{\vec{\phi}} \to E_{\vec{\phi}} \times E_{\vec{\phi}} \times \mathcal{F}, P_1 \mapsto (\psi_{\vec{\phi}}(2P_1), \psi_{\vec{\phi}}(P_1), \vec{\phi}) \end{cases}$$

Likewise, the parameter $\vec{\phi}$ is chosen so that, given a point $P_1$ belonging to $E_{\vec{\phi}}$, the output of the doubling operation does not require ring inversions.

More generally, given two elliptic curves $E_{\vec{\phi}}$ and $E_{\vec{\phi}'}$, that are isomorphic to $E_{\vec{\mathbb{1}}}$, if $$\psi_{\vec{\phi}}\colon E_{\vec{\phi}} \to E_{\vec{\phi}'},$$

denotes the isomorphism between the elliptic curves $E_{\vec{\phi}}$ and $E_{\vec{\phi}'}$; we similarly define the operations $$\begin{cases} iADD_{\vec{\phi}}\colon E_{\vec{\phi}} \times E_{\vec{\phi}} \to E_{\vec{\phi}'} \times \mathcal{F}, (P_1, P_2) \mapsto (\psi_{\vec{\phi}}(P_1+P_2), \vec{\phi}) \\ iADDU_{\vec{\phi}}\colon E_{\vec{\phi}} \times E_{\vec{\phi}} \to E_{\vec{\phi}'} \times E_{\vec{\phi}'} \times \mathcal{F}, \\ (P_1, P_2) \mapsto (\psi_{\vec{\phi}}(P_1+P_2), \psi_{\vec{\phi}}(P_1), \vec{\varphi}) \\ iADDC_{\vec{\phi}}\colon E_{\vec{\phi}} \times E_{\vec{\phi}} \to E_{\vec{\phi}'} \times E_{\vec{\phi}'} \times \mathcal{F}, \\ (P_1, P_2) \mapsto (\psi_{\vec{\phi}}(P_1+P_2), \psi_{\vec{\phi}}(P_1-P_2), \vec{\varphi}) \\ iDBL_{\vec{\phi}}\colon E_{\vec{\phi}} \to E_{\vec{\phi}'} \times \mathcal{F}, P_1 \mapsto (\psi_{\vec{\phi}}(2P_1), \vec{\varphi}) \\ iDBLU_{\vec{\phi}}\colon E_{\vec{\phi}} \to E_{\vec{\phi}'} \times E_{\vec{\phi}'} \times \mathcal{F}, P_1 \mapsto (\psi_{\vec{\phi}}(2P_1), \psi_{\vec{\phi}}(P_1), \vec{\varphi}) \end{cases}$$

Subscript $\vec{\phi}$ in the operator definition indicates that input points belong to the elliptic curve $E_{\vec{\phi}}$.

The following example illustrates the principle. For a general Weierstraβ model defined over a ring $\mathbb{K}$ (whatever is characteristic is), we have $E_{\mathbb{1}}\colon y^2 + a_1xy + a_3y = x^3 + a_2x^2 + a_4x + a_6$, where parameters $a_1$, $a_2$, $a_3$, $a_4$ and $a_6$ belong to $\mathbb{K}$, and $\psi_{\vec{\phi}}\colon E_{\vec{\phi}} \to E_{\vec{\phi}'}$ with $(x,y) \mapsto (u^2x+r, u^3y+u^2sx+t)$, where the description $\vec{\phi}$ of isomorphism is given by the four parameters u, r, s and t. Hence, $\vec{\phi} = (u, r, s, t)$ and $\vec{\mathbb{1}} = (1, 0, 0, 0)$. We also have $\mathcal{F} = \{(U, R, S, T) \in \mathbb{K}^4 | U \in \mathbb{K}^*\}$, where $\mathbb{K}$ is the definition ring of $E_{\mathbb{1}}$. Hence, the isomorphism $\psi_{\vec{\phi}}$ enables the mapping of a point P of $E_{\mathbb{1}}\colon y^2 + a_1xy + a_3y = x^3 + a_2x^2 + a_4x + a_6$ to a point belonging to the elliptic curve $E'_{\mathbb{1}}\colon y^2 + a'_1xy + a'_3y = x^3 + a'_2x^2 + a'_4x + a'_6$, where parameters $a'_1$, $a'_2$, $a'_3$, $a'_4$ and $a'_6$ belong to $\mathbb{K}$. The corresponding curve parameters are related by the following equations:

$$ua_1 = a'_1 + 2s$$

$$u^2 a_2 = a'_2 - sa'_1 + 3r - s^2$$

$$u^3 a_3 = a'_3 + ra'_1 + 2t$$

$$u^4 a_4 = a'_4 - sa'_3 + 2ra'_2 - (t+rs)a'_1 + 3r^2 - 2st$$

$$u^6 a_6 = a'_6 + ra'_4 + r^2 a'_2 + r^3 - ta'_3 - rta'_1$$

When the characteristic of $\mathbb{K}$ is not 2 or 3, one can without loss of generality select $a_1 = a_2 = a_3 = 0$. Likewise, when the characteristic of $\mathbb{K}$ is 2, provided that the elliptic curve is non-supersingular, one can select $a_1 = 1$ and $a_3 = a_4 = 0$.

In the following section, explicit computations to be performed for obtaining the output of the operators iADD, iADDU, iADDC, iDBL and iDBLU are given, with an elliptic curve defined according to the short Weierstraβ model, and over a ring with a characteristic not equal to 2 or 3.

More precisely, the evaluation of $\tilde{P}_3 = (\widetilde{x_3}, \widetilde{y_3}) = \psi_\phi(P_1 + P_2) = (\phi^2 x_3, \phi^3 y_3)$ from the points $P_1$ and $P_2$ (which belong to an elliptic curve $E_{\mathbb{1}}\colon y^2 = x^3 + a \cdot x + b$ (according to the short Weierstraβ model) defined over a ring $\mathbb{K}$ with a characteristic not equal to 2 or 3 can be done as follows:

Obtaining $\phi = x_1 - x_2$ in $\mathbb{K}$;
Obtaining $C = \phi^2$ in $\mathbb{K}$;
Obtaining $W_1 = x_1 C$ in $\mathbb{K}$;
Obtaining $W_2 = x_2 C$ in $\mathbb{K}$;
Obtaining $D = (y_1 - y_2)^2$ in $\mathbb{K}$;
Obtaining $A_1 = (W_1 - W_2)y_1$ in $\mathbb{K}$;
Then $\widetilde{x_3} = D - W_1 - W_2$ in $\mathbb{K}$ and $\widetilde{y_3} = (W_1 - \widetilde{x_3})(y_1 - y_2) - A_1$ in $\mathbb{K}$.

This series of operations corresponds to the iADD operation, which has a global cost of 4M+2S, where M and S denote the cost of a multiplication and of a squaring in $\mathbb{K}$, respectively. It should be noted that the obtaining of $\tilde{P}_1 = (\widetilde{x_1}, \widetilde{y_1}) = \psi_\phi(P_1) = (\phi^2 x_1, \phi^3 y_1)$ come for free during the evaluation of $\tilde{P}_3$. Indeed, we immediately have $\tilde{P}_1 = (\widetilde{x_1}, \widetilde{y_1})$ with $\widetilde{x_1} = W_1$ and $\widetilde{y_1} = A_1$.

As mentioned previously, the operation of getting $\tilde{P}_3$ together with $\tilde{P}_1$ is noted iADDU.

The evaluation of $\tilde{P'}_3 = (\widetilde{x'_3}, \widetilde{y'_3}) = \psi_\phi(P_1 - P_2) = (\phi^2 x'_3, \phi^3 y'_3)$ from the points $P_1$ and $P_2$ (which belong to an elliptic curve $E_{\mathbb{1}}\colon y^2 = x^3 + a \cdot x + b$ defined over a finite ring $\mathbb{K}$ with a characteristic not equal to 2 or 3) can be done as follows:

Obtaining $W_1 = x_1 C$ in $\mathbb{K}$;
Obtaining $W_2 = x_2 C$ in $\mathbb{K}$;
Obtaining $A_1 = (W_1 - W_2)y_1$ in $\mathbb{K}$;
Then $\widetilde{x'}_{33} = (y_1 + y_2)^2 - W_1 - W_2$ in $\mathbb{K}$ and $\widetilde{y'}_3 = (W_1 - \widetilde{x'}_{33})(y_1 + y_2) - A_1$ in $\mathbb{K}$.

Indeed, since $-P_2 = (x_2, -y_2)$, it follows that $P_1 - P_2 = (x'_3, y'_3)$ satisfies $\phi^2 x'_3 = (y_1 + y_2)^2 - \phi^2 x_1 - \phi^2 x_2$ and $\phi^3 y'_3 = (\phi^2 x_1 - \phi^2 x'_3)$ $(y_1+y_2)-\phi^3 y_1$. Hence, the operation of obtaining $\psi_\phi(P_1-P_2)$, noted iADDC, only needs 5M+3S.

The evaluation of $\tilde{P}_4=(\widetilde{x_4}, \widetilde{y_4})=\psi_\phi(2P_1)$ from the points $P_1$ (which belongs to an elliptic curve $E_{\mathbb{I}}: y^2=x^3+a\cdot x+b$ defined over a finite ring with a characteristic not equal to 2 or 3) can be done as follows:

Obtaining $B=x_1^2$ in $\mathbb{K}$;

Obtaining $E=y_1^2$ in $\mathbb{K}$;

Obtaining $L=E^2$ in $\mathbb{K}$;

Obtaining $M=3B+a$ in $\mathbb{K}$;

Obtaining $S=2((x_1+E)^2-B-L)$ in $\mathbb{K}$;

Then $\widetilde{x_4}=M^2-2S$ in $\mathbb{K}$ and $\widetilde{y_4}=M(S-\widetilde{x_4})-8L$ in $\mathbb{K}$.

The evaluation of $\tilde{P}_4=(\widetilde{x_4}, \widetilde{y_4})$ is noted iDBL, and such operation needs only 1M+5S. Moreover, the obtaining of $\tilde{P}_1=(\widetilde{x_1}, \widetilde{y_1})=\psi_\phi(P_1)$ come for free during the evaluation of $\tilde{P}_4$. Indeed, we have $\widetilde{x_1} S$, and $\widetilde{y_1}=8L$. The operation consisting of obtaining $\tilde{P}_4$ as well as $\tilde{P}_1$ is noted, as previously mentioned, iDBLU.

One of the most used operation in cryptographic scheme using elliptic curves is the scalar multiplication.

FIG. 1 presents a scalar multiplication on elliptic curve according to one embodiment of the invention.

More precisely, the scalar multiplication comprises the use of the doubling and adding operations via the use of a chain or series of isomorphisms that are determined during the scalar multiplication process.

Let $E^{(0)}=E_{\mathbb{I}}$ denote the original elliptic curve, and $E^{(i)}=E_{\vec{\phi}_i}$ the current elliptic curve at step I, and $E^{(l(k))}=E_{\vec{\phi}_{l(k)}}$, the final elliptic, we have $P \in E^{(0)}$ and $\tilde{Q}:=k((\psi_{\vec{\phi}_i} \bigcirc \ldots \bigcirc \psi_{\vec{\phi}_i} \bigcirc \ldots \bigcirc \psi_{\vec{\phi}_1})P) \in E^{(l(k))}$.

The isomorphism between the current curve at Step i and the original curve is given by $\psi_{\vec{\phi}_i}=\psi_{\vec{\phi}_i} \bigcirc \ldots \bigcirc \psi_{\vec{\phi}_1}$. Slightly abusing the notation, we also use symbol $\bigcirc$ denote the operation on the corresponding descriptions, namely Desc $(\psi_{\vec{\phi}_i})=\vec{\phi}_i \bigcirc \ldots \bigcirc \vec{\phi}_1$. Since $\tilde{Q}=k(\psi_{\vec{\phi}_{l(k)}}(P))=\psi_{l(k)}(k\cdot P)$, result point $Q=k\cdot P \in E^{(0)}$ is then given by $Q=\psi_{\vec{\phi}_{l(k)}}^{-1}(\tilde{Q})$. The 'composed' isomorphism $\psi_{\vec{\phi}_{l(k)}}$ can be obtained iteratively by observing that $\psi_{\vec{\phi}_i}=\psi_{\vec{\phi}_i} \bigcirc \psi_{\vec{\phi}_{i-1}}$ with $\psi_{\vec{\phi}_0}=\mathrm{Id}$ (i.e. the identity map). Since $\vec{\phi}_i=\mathrm{Desc}(\psi_{\vec{\phi}_i})$, we get $\vec{\phi}_i=\vec{\phi}_i \bigcirc \vec{\phi}_{i-1}$, with $\vec{\phi}_0=\mathrm{Desc}(\mathrm{Id}):=\mathbb{1}$.

The following example illustrates such principle. For a general Weierstraß model, we have $$\psi_{\vec{\phi}_{i-1}}:E^{(0)} \to E^{(i-1)}, (x,y) \mapsto (U_{i-1}^2 x+R_{i-1}, U_{i-1}^3 y+U_{i-1}^2 S_{i-1} x+T_{i-1}),$$

and $$\psi_{\vec{\phi}_i}:E^{(i-1)} \to E^{(i)}, (x,y) \mapsto (u_i^2 x+r_i, u_i^3 y+u_i^2 s_i x+t_i),$$

where $\vec{\phi}_{i-1}=(U_{i-1}, R_{i-1}, S_{i-1}, T_{i-1})$, $\vec{\phi}_i=(u_i, r_i, s_i, t_i)$, and $\mathbb{1}=(1, 0, 0, 0)$. Hence, the equation $\vec{\phi}_i=\vec{\phi}_i \bigcirc \vec{\phi}_{i-1}$ translates into $(U_i, R_i, S_i, T_i)=(u_i, r_i, s_i, t_i) \bigcirc (U_{i-1}, R_{i-1}, S_{i-1}, T_{i-1})$ with $$\begin{cases} U_i = U_{i-1} u_i \\ R_i = u_i^2 R_{i-1} + r_i \\ S_i = u_i S_{i-1} + s_i \\ T_i = u_i^3 T_{i-1} + u_i^2 s_i R_{i-1} + t_i \end{cases}$$

for $i \geq 1$, and $(U_0, R_0, S_0, T_0)=(1, 0, 0, 0)$.

FIG. 2 presents two classical methods for performing a scalar multiplication on elliptic curves (the double-and-add method, and the add-and-double method).

A classical method for evaluating Q=kP (i.e. the scalar multiplication on elliptic curves) considers the binary representation of scalar k, $k=(k_{n-1}, \ldots, k_0)_2$, with $k_i \in \{0, 1\}$, $0 \leq i \leq n-1$. Advantageously it requires a minimal number of registers and is hence well suited to memory-constrained devices like smart cards. The method relies on the obvious relation that $kP=2(\lfloor k/2 \rfloor P)$, if k is even and $kP=2(\lfloor k/2 \rfloor P)+P$ if k is odd. Iterating the process yields a left-to-right scalar multiplication algorithm, known as double-and-add method. Such method requires two (point) registers $R_0$ and $R_1$. Register $R_0$ acts as an accumulator and register $R_1$ is used to store the value of input point P.

There exists a right-to-left variant. The resulting algorithm, known as add-and-double method, is depicted in Algorithm 2 of FIG. 2. It also requires two (point) registers, $R_0$ and $R_1$ but in this case both act as accumulators.

FIG. 3 presents two methods for performing a scalar multiplication on elliptic curves according to the present technique.

More precisely, the algorithms or methods presented in FIG. 3 are straightforward implementations of the classical methods with the addition and doubling formulæ according to one embodiment of the invention. We use a variable $\vec{\phi}$ to accumulate [the description of] the current isomorphism with the original curve. This variable is initialized to $\vec{\phi}=\mathbb{1}$ (corresponding to identity map Id). As previously mentioned, the symbol $\bigcirc$ denotes the composition of [the description of] elliptic curve isomorphisms.

FIG. 4 presents another embodiment of a method for performing a scalar multiplication on elliptic curves according to the present technique.

Such embodiment is a variant of the left-to-right method that is more efficient than the one depicted in FIG. 3. By remarking that when $k_i$ is equal to 1, register $R_1$ is added to register $R_0$, and that the content of register $R_1$ remains invariant throughout the computation ($R_1$ always contain input point P), then it is not necessary to constantly update it as a point on the current elliptic curve. Instead, at iteration i, its representative on the current elliptic curve ($E_{\vec{\phi}}$) can be computed from input point P as $\psi_{\vec{\phi}}(P)$.

FIG. 5 presents two classical methods for performing a scalar multiplication on elliptic curves (the Montgomery ladder, and the Joye's double-add ladder).

These classical methods use three registers (register $R_0$, register $R_1$ and register T) in order to store some results of operations.

FIG. 6 presents two modifications of the methods for performing a scalar multiplication on elliptic curves disclosed in FIG. 5, according to one embodiment of the invention.

For several elliptic curve models, the point addition formulæ of two distinct points are independent of the curve parameters. In this case, it is interesting to rely on scalar multiplication algorithms that can be written as a series of iADDU and iADDC operations.

The main loop for Algorithm 6 reads as $R_{1-b} \leftarrow R_b + R_{1-b}$ and $R_b \leftarrow 2R_b$ (where b is equal to 0 or 1), and for Algorithm 7 as $R_{1-b} \leftarrow R_b + 2R_{1-b}$. Therefore, Algorithm 6 and Algorithm 7 can be easily adapted with the new operations proposed in this document. The value $k_{n-1}=1$ leads to $(R_0, T)=(P,P)$, and then to $R_1=P+P$ in the first iteration of Algorithm 6. This last operation is a point doubling. In order not to have to handle potential special cases, we assume that $k_{n-1}=1$ and hence start the for-loop at i=n−2, and initialize $(R_0, R_1)$ with (P, 2P). For better performance, this is achieved thanks to the iDBLU operation. For the same reason, we assume that $k_0=1$ in the right-to-left algorithm. We start the for-loop at i=2 and initialize $(R_{k_1}, R_{1-k_1})$ with (P,3P) in Algorithm 9. Again, this can be done with the new operations. When $k_0=0$, point P needs to be subtracted at the end of the computation to get the correct result.

FIG. 7 presents a modification of Montgomery Ladder method for performing a scalar multiplication on elliptic curves disclosed in FIG. 5, according to one embodiment of the invention.

The original Montgomery ladder keeps invariant the difference $R_1−R_0$, which is equal to P. Equivalently, variable $T$ ($\leftarrow R_b−R_{1-b}$) in Algorithm 6 is equal to $(−1)^{1-b}P$. Therefore, at iteration i=0, variable $R_b$ in our version of the Montgomery ladder (Algorithm 8) contains at Line 4 the value of $\psi_{\vec{\phi}_{2n-2}}((-1)^{1-k_0}P)$. This may allow one to explicitly recover the description of $\psi_{\vec{\phi}_{2n-2}}$ and consequently that of $\psi_{\vec{\phi}_{2n-2}}$ as $\vec{\phi}:=\text{Desc}(\psi_{\vec{\phi}_{2n-1}})=\vec{\phi}_{2n-1}\bigcirc\text{Desc}(\psi_{\vec{\phi}_{2n-2}})$. As a result, we may obtain a Montgomery-like algorithm where there is no need to keep track of the current isomorphism: the iADDC and iADDU operations only need to return the points and not the description of the isomorphism of the resulting curve (i.e., parameter $\vec{\phi}$). This is indicated by symbol ' on the operator. This variant of the Montgomery ladder also requires that the iADDC and iADDU operations are independent of the curve parameters; this is indicated by the absence of subscript $\vec{\phi}$ in the operator.

Figure 8:
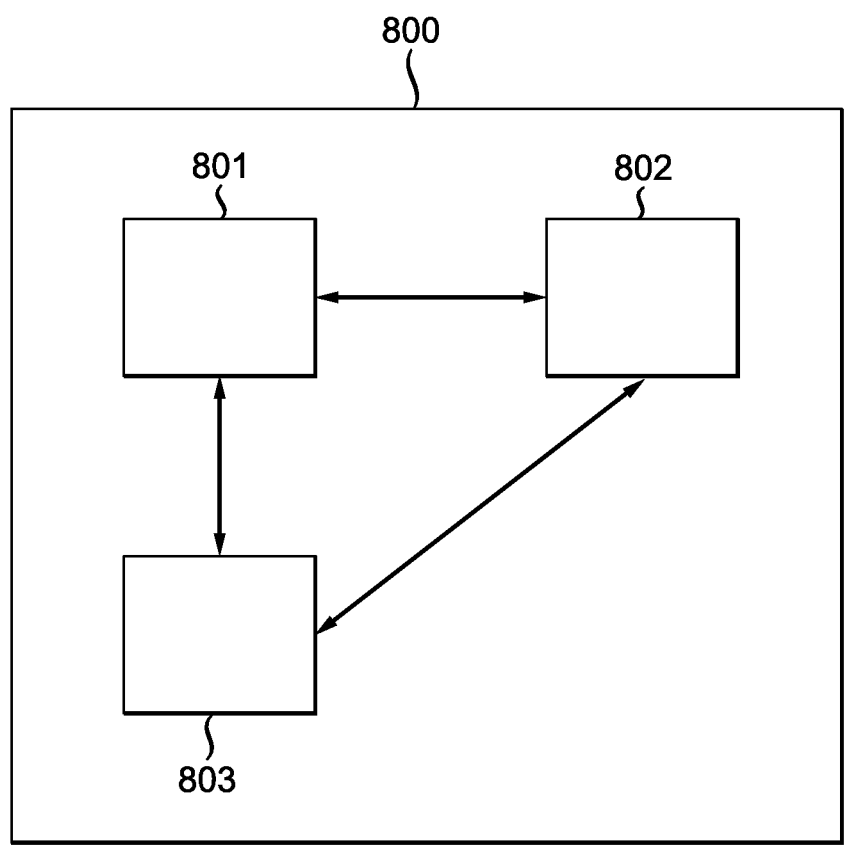
FIG. 8 presents a device that can be used to perform one or several steps of methods disclosed in the present document.

FIG. 8 presents a device that can be used to perform one or several steps of methods (or algorithms) disclosed in the present document.

Such device referenced 800 comprises a computing unit (for example a CPU, for "Central Processing Unit"), referenced 801, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 802. Computer programs are made of instructions that can be executed by the computing unit. Such device 800 can also comprise a dedicated unit, referenced 803, constituting an input-output interface to allow the device 800 to communicate with other devices. In particular, this dedicated unit 803 can be connected with an antenna (in order to perform communication without contacts), or with serial ports (to carry communications "contact"). It should be noted that the arrows in FIG. 8 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 8.

For certain models (including the popular Weierstraβ model), the neutral element (i.e., point at infinity O) needs a special treatment. This can be circumvented by adequately adapting the initialization step. For the classical left-to-right ladders, assuming that $k_{n-1}=1$, we can start the for-loop at i=n−2, and set $R_0\leftarrow P$, and $R_1\leftarrow P$ in Algorithms 3 and 5 at the initialization step.

Similarly, for the right-to-left ladder, assuming that $k_0=1$, we can start the for-loop at i=1, and set $R_0\leftarrow P$, and $R_1\leftarrow 2\cdot P$ in Algorithm 4. When $k_0=0$, we do the same but substrate P at the end of the computation to get the correct result.

It should be noted that for combined operations, such as the evaluation of R=2·P+Q can be done according to the present technique. This can be done in two steps, by first determining T←P+Q, and then the determination of R←P+T. If the point R is needed together with updated point P, this can be carried out with two consecutive applications of the iADDU operation: $(T,P,\vec{\phi}_1)\leftarrow\text{iADDU}_{\vec{\phi}}(P,Q)$; $(R,P,\vec{\phi}_2)\leftarrow\text{iADDU}_{\vec{\phi}_1\bigcirc\vec{\phi}}(P,T)$.

Things are slightly more complex if we want to obtain point R together with updated point Q (rather than point P) at the end of the computation. This can be carried out by an evaluation of iADDU followed by an evaluation of iADDC: $(T,P,\vec{\phi}_1)\leftarrow\text{iADDU}_{\vec{\phi}}(P,Q)$; $(R,Q,\vec{\phi}_2)\leftarrow\text{iADDC}_{\vec{\phi}_1\bigcirc\vec{\phi}}(P,T)$.

At last, it should be noted that the proposed technique based on isomorphic elliptic curves is compliant with technique that prevents side channel attacks such as a curve randomization at each execution of the technique.

The invention claimed is:

1. A method of cryptographic processing of data, the method being executed by an electronic device comprising a memory and at least one hardware processor coupled to said memory, the method comprising obtaining at least two points represented in an affine coordinate system, and denoted respectively $P_1=(x_1, y_1)$ and $P_2=(x_2, y_2)$ belonging to a same elliptic curve defined on an algebraic structure being a finite ring, wherein the method further comprises:
   obtaining a parameterization of an isomorphism $\psi$ between said elliptic curve, denoted as $E^{(i-1)}$ and another elliptic curve, denoted as $E^{(i)}$, said parameterization defining some configuration parameters being either equal to u, when a Weierstrass model is used for representing said elliptic curves, wherein $\psi(x, y)=(u^2x, u^3y)$, or being equal to u, r, s, t when a general Weierstrass model is used for representing said elliptic curve, wherein $\psi(x, y)=(u^2x+r, u^3y+u^2sx+t)$;
   determining said configuration parameters as a function of values of coordinates of said at least two points, delivering determined configuration parameters, wherein $u=x_1-x_2$, or $u=2y_1$;
   obtaining coordinates of another point denoted Q corresponding to an image of an addition of said at least two points through said isomorphism, said another point belonging to said another elliptic curve, and said obtaining being performed without an inversion operation in said algebraic structure, due to said determined configuration parameters, wherein $Q=\psi(P_1+P_2)$.

2. The method according to claim 1, wherein when said at least two points are identical meaning $P_1$ is equal to $P_2$, and said addition is a doubling operation.

3. The method according to claim 1, wherein it is used in a scalar multiplication operation with a first point denoted P belonging to a first elliptic curve denoted $E^{(0)}$.

4. The method according to claim 3, wherein it comprises converting an output point of said scalar multiplication operation, said output point belonging to a last elliptic curve denoted $E^{(l(k))}$, to a converted output point belonging to said first elliptic curve.

5. The method according to claim 3, wherein it further comprises determining configuration parameters r, s, t based on the previously used configuration parameters.

6. The method according to claim 1, wherein said algebraic structure is a finite field having a characteristic equal to 2.

7. The method according to claim 1, wherein said algebraic structure is a finite field having a characteristic equal to 3.

8. The method according to claim 1, wherein said algebraic structure is a finite field having a characteristic equal to a prime number p>3.

9. A non-transitory computer-readable storage medium storing a computer program comprising a set of computer-executable instructions to implement a method for cryptographic computations when the instructions are executed by a hardware processor of a computer, wherein the instructions comprise instructions, which when executed, configure the hardware computer to perform a method of cryptographic processing of data, the method comprising:
- obtaining at least two points represented in an affine coordinate system, and denoted respectively $P_1=(x_1, y_1)$ and $P_2=(x_2,y_2)$ belonging to a same elliptic curve defined on an algebraic structure being a finite ring;
- obtaining a parameterization of an isomorphism $\psi$ between said elliptic curve denoted as $E^{(i-1)}$ and another elliptic curve denoted as $E^{(i)}$, said parameterization defining some configuration parameters being either equal to u, when a Weierstrass model is used for representing said elliptic curves, wherein $\psi(x, y)=(u^2x, u^3y)$, or being equal to u, r, s, t when a general Weierstrass model is used for representing said elliptic curve, wherein $\psi(x, y)=(u^2x+r, u^3y+u^2sx+t)$;
- determining said configuration parameters as a function of values of coordinates of said at least two points, delivering determined configuration parameters, wherein $u=x_1-x_2$, or $u=2y_1$;
- obtaining coordinates of another point denoted Q corresponding to an image of an addition of said at least two points through said isomorphism, said another point belonging to said another elliptic curve, and said obtaining being performed without an inversion operation in said algebraic structure, due to said determined configuration parameters, wherein $Q=\psi(P_1+P_2)$.

10. An electronic device configured to perform a cryptographic processing of data, said electronic device comprising a memory and at least one hardware processor coupled to the memory, the at least one hardware processor being configured to obtain at least two points represented in an affine coordinate system, and denoted respectively $P_1=(x_1, y_1)$ and $P_2=(x_2, y_2)$ belonging to a same elliptic curve defined on an algebraic structure being a finite ring, wherein the at least one hardware processor is further configured to:
- obtain a parameterization of an isomorphism $\psi$ between said elliptic curve denoted as $E^{(i-1)}$ and another elliptic curve, denoted as $E^{(i)}$, said parameterization defining some configuration parameters, being either equal to u, when a Weierstrass model is used for representing said elliptic curves, wherein $\psi(x, y)=(u^2x, u^3y)$, or being equal to u, r, s, t when a general Weierstrass model is used for representing said elliptic curve, wherein $\psi(x, y)=(u^2x+r, u^3y+u^2sx+t)$;
- determine said configuration parameters as a function of values of coordinates of said at least two points, delivering determined configuration parameters, wherein $u=x_1-x_2$, or $u=2y_1$;
- obtain coordinates of another point denoted Q corresponding to an image of an addition of said at least two points through said isomorphism, said another point belonging to said another elliptic curve, without performing an inversion operation in said algebraic structure, due to said determined configuration parameters, wherein $Q=\psi(P_1+P_2)$.

11. The electronic device according to claim 10, wherein when said at least two points are identical meaning $P_1$ is equal to $P_2$, and said addition is a doubling operation.

12. The electronic device according to claim 10, wherein said at least one hardware processor is further configured to perform a scalar multiplication operation with a first point denoted P belonging to a first elliptic curve denoted $E^{(0)}$.

13. The electronic device according to claim 12, wherein said hardware processor is further configured to determine configuration parameters r, s, t based on the previously used configuration parameters.

14. The electronic device according to claim 12, wherein said at least one hardware processor is further configured to convert an output point of said scalar multiplication operation, said output point belonging to a last elliptic curve denoted $E^{(l(k))}$, to a converted output point belonging to said first elliptic curve.

15. The electronic device according to claim 10, wherein said algebraic structure is further a finite field having a characteristic equal to a prime number p>3.

* * * * *